US011859797B2

(12) United States Patent
Zou

(10) Patent No.: US 11,859,797 B2
(45) Date of Patent: Jan. 2, 2024

(54) LAMP HOLDER STRUCTURE

(71) Applicant: Xinjiang Zou, Meizhou (CN)

(72) Inventor: Xinjiang Zou, Meizhou (CN)

( * ) Notice: Subject to any disclaimer, the term of this patent is extended or adjusted under 35 U.S.C. 154(b) by 196 days.

(21) Appl. No.: 17/096,867

(22) Filed: Nov. 12, 2020

(65) Prior Publication Data

US 2022/0146081 A1 May 12, 2022

(51) Int. Cl.
*F21V 23/00* (2015.01)
*F21V 15/01* (2006.01)
*F21V 21/08* (2006.01)
*F21V 31/00* (2006.01)

(52) U.S. Cl.
CPC .............. *F21V 21/08* (2013.01); *F21V 15/01* (2013.01); *F21V 23/002* (2013.01); *F21V 31/005* (2013.01)

(58) Field of Classification Search
CPC ........ F21V 21/08; F21V 15/01; F21V 23/002; F21V 31/005
See application file for complete search history.

(56) References Cited

U.S. PATENT DOCUMENTS 5,380,215 A * 1/1995 Huang ................... H01R 33/22 439/340
5,446,640 A * 8/1995 Lin ...................... H01R 4/2406 362/396
5,474,467 A * 12/1995 Chen ..................... F21V 21/002 439/417
5,531,609 A * 7/1996 Cheng .................. H01R 4/2404 439/340
5,702,267 A * 12/1997 Chen ..................... F21V 21/002 439/340
9,793,668 B1 * 10/2017 Peng ...................... H01R 33/22
9,980,473 B2 * 5/2018 Dyer ...................... F21V 33/008
2006/0087852 A1 * 4/2006 Richmond .............. F21V 17/18 362/374
2015/0070894 A1 * 3/2015 Chuang .............. H01R 33/9651 362/249.06
2016/0153630 A1 * 6/2016 Dong .................... F21S 10/046 362/284
2018/0149345 A1 * 5/2018 Zhang ................... F21V 21/002

FOREIGN PATENT DOCUMENTS

CN 204271413 * 4/2015 ............ F21V 21/002
CN 20160004067 A * 1/2016 ............ F21V 21/002
CN 206498015 * 9/2017 ............ F21V 21/002

* cited by examiner

*Primary Examiner* — Fatima N Farokhrooz

(57) ABSTRACT

The present disclosure discloses a novel lamp holder structure. A lamp holder shell of the novel lamp holder structure comprises a shell main body and a lamp holder top cover arranged at the upper end of the shell main body, a bulb installation hole is formed in the shell main body, a main body installation part located above the bulb installation hole is arranged at the upper end of the shell main body, a wire placing groove is formed in the middle of the main body installation part, a top cover wire pressing part is arranged in the middle of the lamp holder top cover. By means of the structural design, the present disclosure has the advantages of being novel in design, simple in structure and convenient and fast to wire.

8 Claims, 9 Drawing Sheets

LAMP HOLDER STRUCTURE

TECHNICAL FIELD

The present disclosure relates to the technical field of lamp holders, in particular to a novel lamp holder structure.

BACKGROUND

Illumination and power connection of a bulb are achieved through a lamp holder, two conductive terminals are installed in the lamp holder, and each conductive terminal is electrically connected with an electric wire; and when the bulb is installed on the lamp holder, one electrode of the bulb electrically makes contact with one conductive terminal for conduction, and the other electrode of the bulb electrically makes contact with the other conductive terminal for conduction.

It needs to be pointed out that for an existing lamp holder structure, one conductive terminal of the lamp holder is a copper lamp holder, in order to guarantee insulativity, a rubber coating layer structure is arranged on the periphery of the lamp holder, and electric conduction of wires corresponding to the conductive terminals is achieved in a welded or threaded connection mode.

Compared with the existing lamp holder structure, the lamp holder structure has the defects of being complex in structure and inconvenient to wire.

SUMMARY

The present disclosure aims to provide a novel lamp holder structure aiming at the defects in the prior art. The novel lamp holder structure is novel in design, simple in structure and convenient and rapid to wire.

In order to achieve the above purpose, the present disclosure adopts the following technical scheme:

a novel lamp holder structure comprises a lamp holder shell, the lamp holder shell comprises a shell main body and a lamp holder top cover arranged at the upper end of the shell main body, and the shell main body and the lamp holder top cover are hard plastic parts respectively;

a bulb installation hole with a downward opening is formed in the shell main body, a main body installation part located above the bulb installation hole is arranged at the upper end of the shell main body, and the main body installation part and the shell main body are of an integrated structure; a wire placing groove which is opened upwards and completely penetrates left and right is formed in the middle of the main body installation part of the shell main body, a first installation groove and a second installation groove which communicate with the bulb installation hole respectively are formed in the bottom surface of the wire placing groove, the first installation groove and the second installation groove are arranged at intervals, a first conductive elastic sheet is embedded in the first installation groove, a second conductive elastic sheet is embedded in the second installation groove, and the lower ends of the first conductive elastic sheet and the second conductive elastic sheet stretch into the bulb installation hole respectively; the upper end of the first conductive elastic sheet is provided with a first elastic sheet tip which protrudes upwards and extends into the wire placing groove, and the upper end of the second conductive elastic sheet is provided with a second elastic sheet tip which protrudes upwards and extends into the wire placing groove;

a top cover wire pressing part which protrudes downwards and is aligned with the wire placing groove is arranged in the middle of the lamp holder top cover, and the top cover wire pressing part and the lamp holder top cover are of an integrated structure;

when the novel lamp holder structure is used for wiring, two wires are located and placed in the wire placing groove of the main body installation part, the top cover wire pressing part of the lamp holder top cover presses the two wires downwards, the first elastic sheet tip of the first conductive elastic sheet pierces through an insulating layer of one wire and is electrically in contact with a wire core of the wire, and the second elastic sheet tip of the second conductive elastic sheet pierces through an insulating layer of the other wire and is electrically in contact with a wire core of the other wire.

Wherein, the first conductive elastic sheet comprises a first elastic sheet fixing part and a first elastic sheet elastic contact part arranged at the lower end of the first elastic sheet fixing part, the first elastic sheet tip is arranged at the upper end of the first elastic sheet fixing part, the first elastic sheet elastic contact part stretches into the bulb installation hole, and the first elastic sheet fixing part, the first elastic sheet elastic contact part and the first elastic sheet tip are of an integrated structure; and a first elastic sheet locating groove is formed in the inner wall of the first installation groove, and the edge part of the first elastic sheet fixing part of the first conductive elastic sheet is embedded in the first elastic sheet locating groove.

Wherein, the second conductive elastic sheet comprises a second elastic sheet fixing part and a second elastic sheet elastic contact part arranged at the lower end of the second elastic sheet fixing part, the second elastic sheet tip is arranged at the upper end of the second elastic sheet fixing part, the second elastic sheet elastic contact part stretches into the bulb installation hole, and the second elastic sheet fixing part, the second elastic sheet elastic contact part and the second elastic sheet tip are of an integrated structure; and a second elastic sheet locating groove is formed in the inner wall of the second installation groove, and the edge part of the second elastic sheet fixing part of the second conductive elastic sheet is embedded in the second elastic sheet locating groove.

Wherein, the first conductive elastic sheet and the second conductive elastic sheet are copper elastic sheets respectively.

Wherein, the lamp holder top cover is provided with two top cover buckling tongues which protrude and extend downwards respectively, each top cover buckling tongue and the lamp holder top cover are of an integrated structure, and the two top cover buckling tongues are arranged at intervals oppositely; and the main body installation part is provided with main body buckling holes corresponding to the top cover buckling tongues respectively, and the top cover buckling tongues are buckled in the corresponding main body buckling holes respectively.

Wherein, a fixed hanging ring is arranged on the upper surface of the lamp holder top cover, and the fixed hanging ring and the lamp holder top cover are of an integrated structure.

Wherein, the lamp holder top cover is provided with a wire hiding hole in the bottom surface of the top cover wire pressing part.

Wherein, a fixed hook is arranged on the edge part of the lamp holder top cover.

Wherein, the periphery of the lamp holder shell is coated with a waterproof sealing rubber coating layer.

The present disclosure has the beneficial effects that the novel lamp holder structure comprises a lamp holder shell, the lamp holder shell comprises a shell main body and a lamp holder top cover arranged at the upper end of the shell main body, and the shell main body and the lamp holder top cover are hard plastic parts respectively; a bulb installation hole with a downward opening is formed in the shell main body, a main body installation part located above the bulb installation hole is arranged at the upper end of the shell main body, and the main body installation part and the shell main body are of an integrated structure; a wire placing groove which is opened upwards and completely penetrates left and right is formed in the middle of the main body installation part of the shell main body, a first installation groove and a second installation groove which communicate with the bulb installation hole respectively are formed in the bottom surface of the wire placing groove, the first installation groove and the second installation groove are arranged at intervals, a first conductive elastic sheet is embedded in the first installation groove, a second conductive elastic sheet is embedded in the second installation groove, and the lower ends of the first conductive elastic sheet and the second conductive elastic sheet stretch into the bulb installation hole respectively; the upper end of the first conductive elastic sheet is provided with a first elastic sheet tip which protrudes upwards and extends into the wire placing groove, and the upper end of the second conductive elastic sheet is provided with a second elastic sheet tip which protrudes upwards and extends into the wire placing groove; a top cover wire pressing part which protrudes downwards and is aligned with the wire placing groove is arranged in the middle of the lamp holder top cover, and the top cover wire pressing part and the lamp holder top cover are of an integrated structure; when the novel lamp holder structure is used for wiring, two wires are located and placed in the wire placing groove of the main body installation part, the top cover wire pressing part of the lamp holder top cover presses the two wires downwards, the first elastic sheet tip of the first conductive elastic sheet pierces through an insulating layer of one wire and is electrically in contact with a wire core of the wire, and the second elastic sheet tip of the second conductive elastic sheet pierces through an insulating layer of the other wire and is electrically in contact with a wire core of the other wire. By means of the structural design, the present disclosure has the advantages of being novel in design, simple in structure and convenient and fast to wire.

BRIEF DESCRIPTION OF DRAWINGS

The present disclosure is further illustrated below with the use of the accompanying drawings, but the embodiments in the accompanying drawings do not constitute any limitation of the present disclosure.

Figure 1:
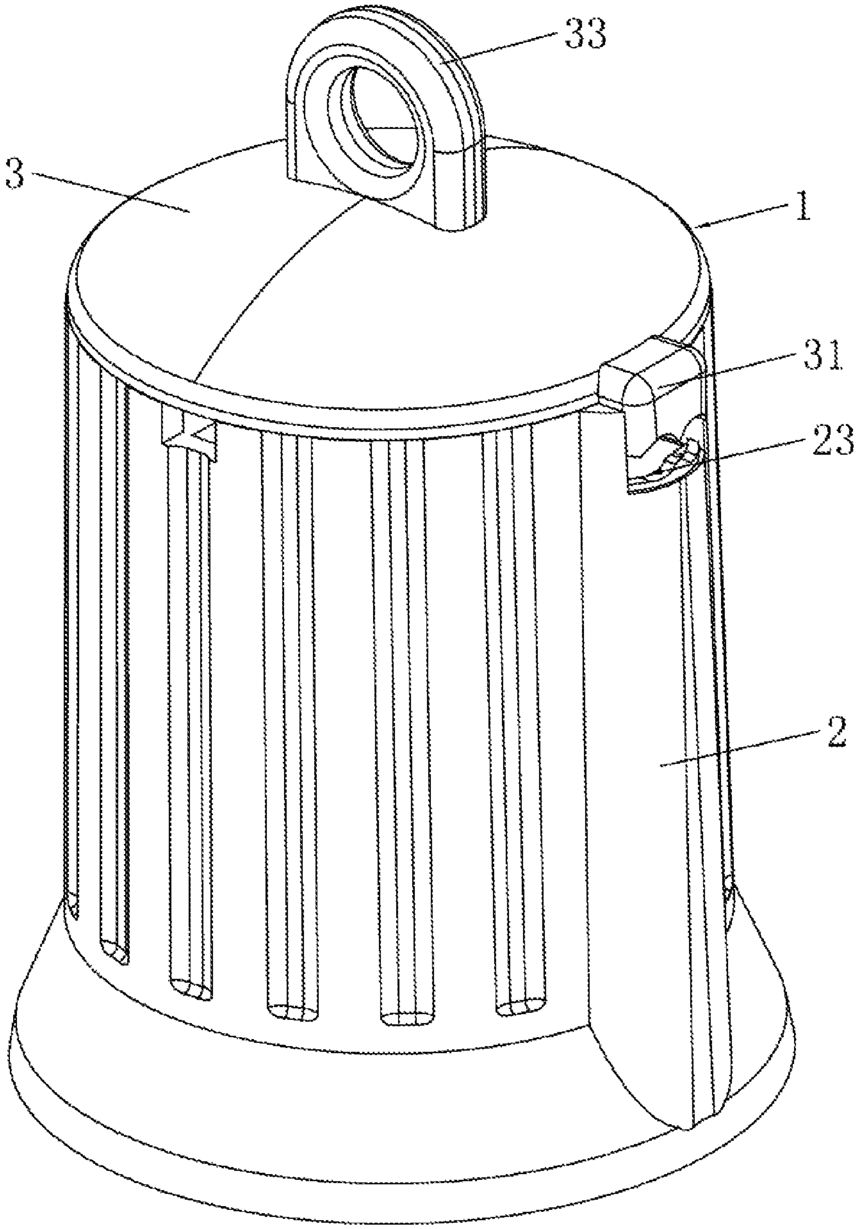
FIG. 1 is a structural diagram of the present disclosure.

Components are included in FIG. 1 to FIG. 9:

1, lamp holder shell; 2, shell main body;

21, lamp holder installation hole; 22, main body installation part;

23, wire placing groove; 24, first installation groove;

242, first elastic sheet locating groove; 251, second installation groove;

252, second elastic sheet locating groove; 26, main body buckling hole;

3, lamp holder top cover; 31, top cover wire pressing part;

32, top cover buckling tongue; 33, fixed hanging ring;

34, wire hiding hole; 35, fixed hook;

4, first conductive elastic sheet; 41, first elastic sheet tip;

42, first elastic sheet fixing part; 43, first elastic sheet elastic contact part;

5, second conductive elastic sheet; 51, second elastic sheet tip;

52, second elastic sheet fixing part; and 53, second elastic sheet elastic contact part;

6, waterproof sealing rubber coating layer.

DESCRIPTION OF EMBODIMENTS

The present disclosure is described below in combination with specific embodiments.

As shown in FIG. 1 to FIG. 5, a novel lamp holder structure comprises a lamp holder shell 1, the lamp holder shell 1 comprises a shell main body 2 and a lamp holder top cover 3 arranged at the upper end of the shell main body 2, and the shell main body 2 and the lamp holder top cover 3 are hard plastic parts respectively.

Wherein, a bulb installation hole 21 with a downward opening is formed in the shell main body 2, a main body installation part 22 located above the bulb installation hole 21 is arranged at the upper end of the shell main body 2, and the main body installation part 22 and the shell main body 2 are of an integrated structure; a wire placing groove 23 which is opened upwards and completely penetrates left and right is formed in the middle of the main body installation part 22 of the shell main body 2, a first installation groove 241 and a second installation groove 251 which communicate with the bulb installation hole 21 respectively are formed in the bottom surface of the wire placing groove, the first installation groove 241 and the second installation groove 251 are arranged at intervals, a first conductive elastic sheet 4 is embedded in the first installation groove 241, a second conductive elastic sheet 5 is embedded in the second installation groove 251, and the lower ends of the first conductive elastic sheet 4 and the second conductive elastic sheet 5 stretch into the bulb installation hole 21 respectively; the upper end of the first conductive elastic sheet 4 is provided with a first elastic sheet tip 41 which protrudes upwards and extends into the wire placing groove 23, and the upper end of the second conductive elastic sheet 5 is provided with a second elastic sheet tip 51 which protrudes upwards and extends into the wire placing groove 23.

Preferably, the first conductive elastic sheet 4 and the second conductive elastic sheet 5 are copper elastic sheets respectively; and certainly, the above copper materials do not limit the present disclosure, namely the first conductive elastic sheet 4 and the second conductive elastic sheet 5 of the present disclosure can also be made of other conductive metal materials.

Further, a top cover wire pressing part 31 which protrudes downwards and is aligned with the wire placing groove 23 is arranged in the middle of the lamp holder top cover 3, and the top cover wire pressing part 31 and the lamp holder top cover 3 are of an integrated structure.

It needs be pointed out that when the novel lamp holder structure is used for wiring, two wires are located and placed in the wire placing groove 23 of the main body installation part 22, the top cover wire pressing part 31 of the lamp holder top cover 3 presses the two wires downwards, the first elastic sheet tip 41 of the first conductive elastic sheet 4 pierces through an insulating layer of one wire and is electrically in contact with a wire core of the wire, and the second elastic sheet tip 51 of the second conductive elastic sheet 5 pierces through an insulating layer of the other wire and is electrically in contact with a wire core of the other wire.

It needs to be explained that the first conductive elastic sheet 4 comprises a first elastic sheet fixing part 42 and a first elastic sheet elastic contact part 43 arranged at the lower end of the first elastic sheet fixing part 42, the first elastic sheet tip 41 is arranged at the upper end of the first elastic sheet fixing part 42, the first elastic sheet elastic contact part 43 stretches into the bulb installation hole 21, and the first elastic sheet fixing part 42, the first elastic sheet elastic contact part 43 and the first elastic sheet tip 41 are of an integrated structure; and a first elastic sheet locating groove 242 is formed in the inner wall of the first installation groove 241, and the edge part of the first elastic sheet fixing part 42 of the first conductive elastic sheet 4 is embedded in the first elastic sheet locating groove 242. In the process that the first conductive elastic sheet 4 is installed on the main body installation part 22, the first conductive elastic sheet 4 is embedded in the first installation groove 241 of the main body installation part 22, and the edge part of the first elastic sheet fixing part 42 is embedded in the first elastic sheet locating groove 242. According to the present disclosure, the first conductive elastic sheet 4 can be rapidly installed and located through the cooperation of the first elastic sheet locating groove 242 and the edge part of the first elastic sheet fixing part 42; and during installation, the first conductive elastic sheet 4 can be installed only by aligning the edge part of the first elastic sheet fixing part 42 and inserting the edge part of the first elastic sheet fixing part 42 into the first elastic sheet locating groove 242, and the installation is convenient and rapid.

Similarly, the second conductive elastic sheet 5 comprises a second elastic sheet fixing part 52 and a second elastic sheet elastic contact part 53 arranged at the lower end of the second elastic sheet fixing part 52, the second elastic sheet tip 51 is arranged at the upper end of the second elastic sheet fixing part 52, the second elastic sheet elastic contact part 53 stretches into the bulb installation hole 21, and the second elastic sheet fixing part 52, the second elastic sheet elastic contact part 53 and the second elastic sheet tip 51 are of an integrated structure; and a second elastic sheet locating groove 252 is formed in the inner wall of the second installation groove 251, and the edge part of the second elastic sheet fixing part 52 of the second conductive elastic sheet 5 is embedded in the second elastic sheet locating groove 252. In the process that the second conductive elastic sheet 5 is installed on the main body installation part 22, the second conductive elastic sheet 5 is embedded in the second installation groove 251 of the main body installation part 22, and the edge part of the second elastic sheet fixing part 52 is embedded in the second elastic sheet locating groove 252. According to the present disclosure, the second conductive elastic sheet 5 can be rapidly installed and located through the cooperation of the second elastic sheet locating groove 252 and the edge part of the second elastic sheet fixing part 52; and during installation, the second conductive elastic sheet 4 can be installed only by aligning the edge part of the second elastic sheet fixing part 52 and inserting the edge part of the second elastic sheet fixing part 52 into the second elastic sheet locating groove 252, and the installation is convenient and rapid.

Figure 2:
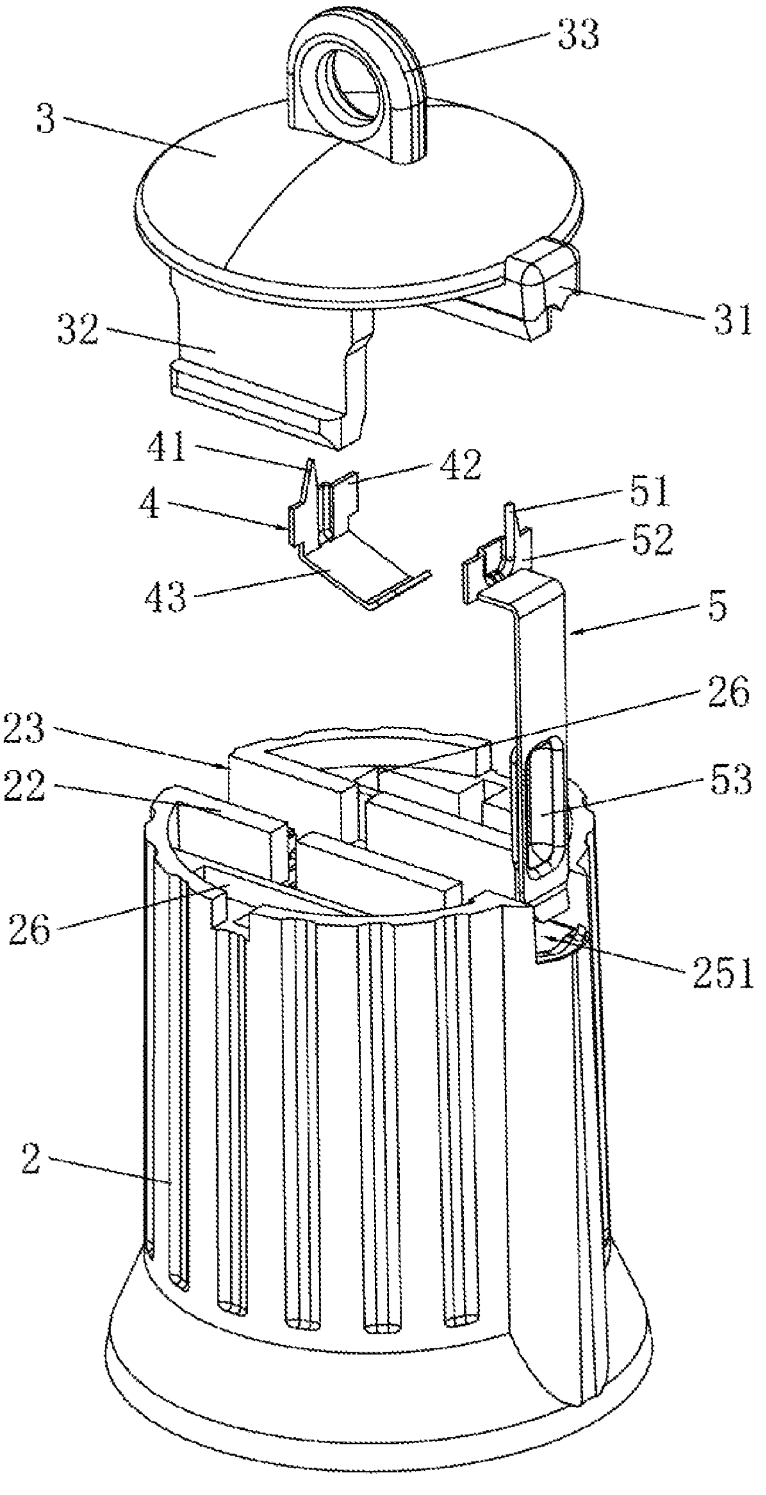
FIG. 2 is a decomposition diagram of the present disclosure.
Figure 3:
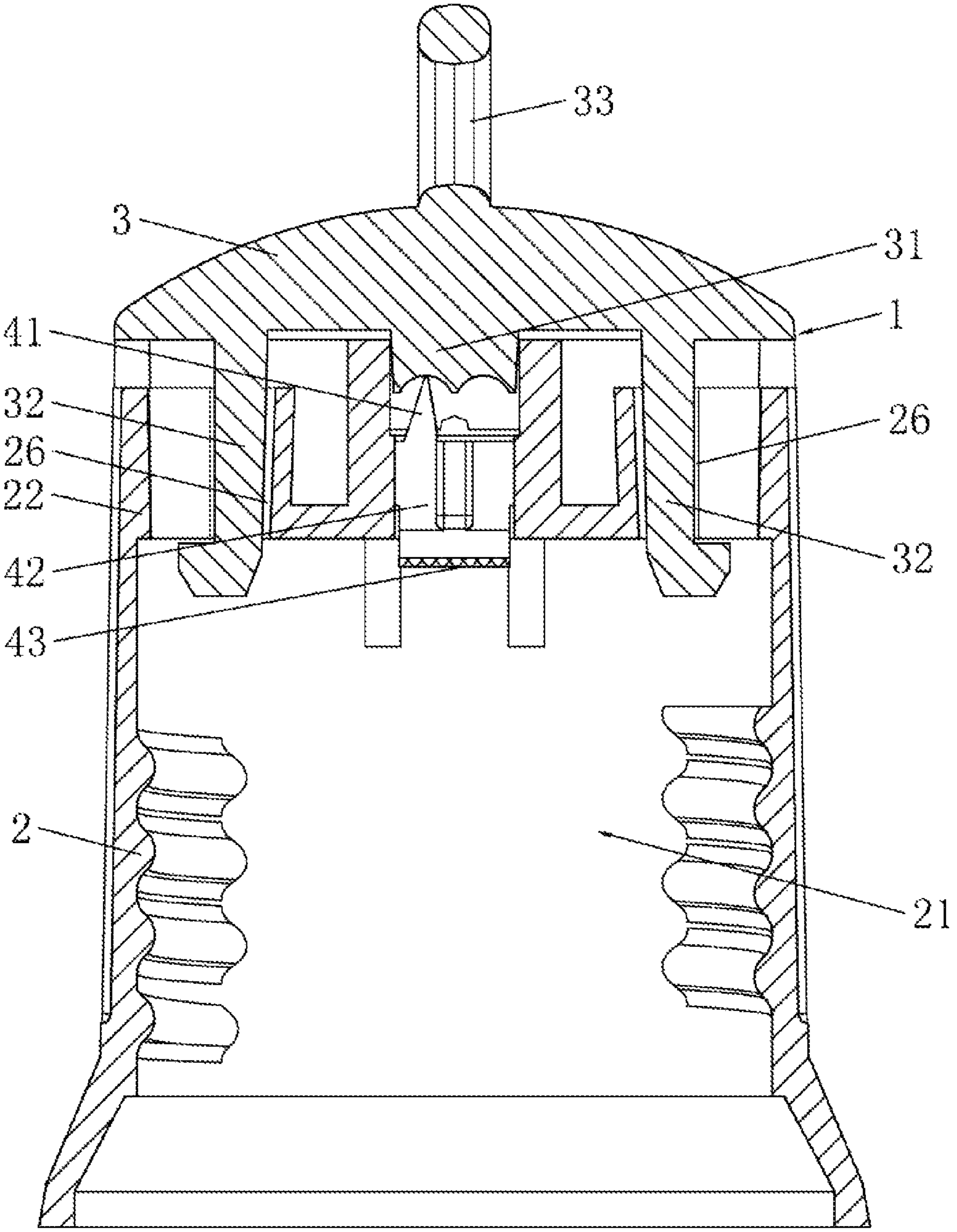
FIG. 3 is a cross-section diagram of the present disclosure.
Figure 5:
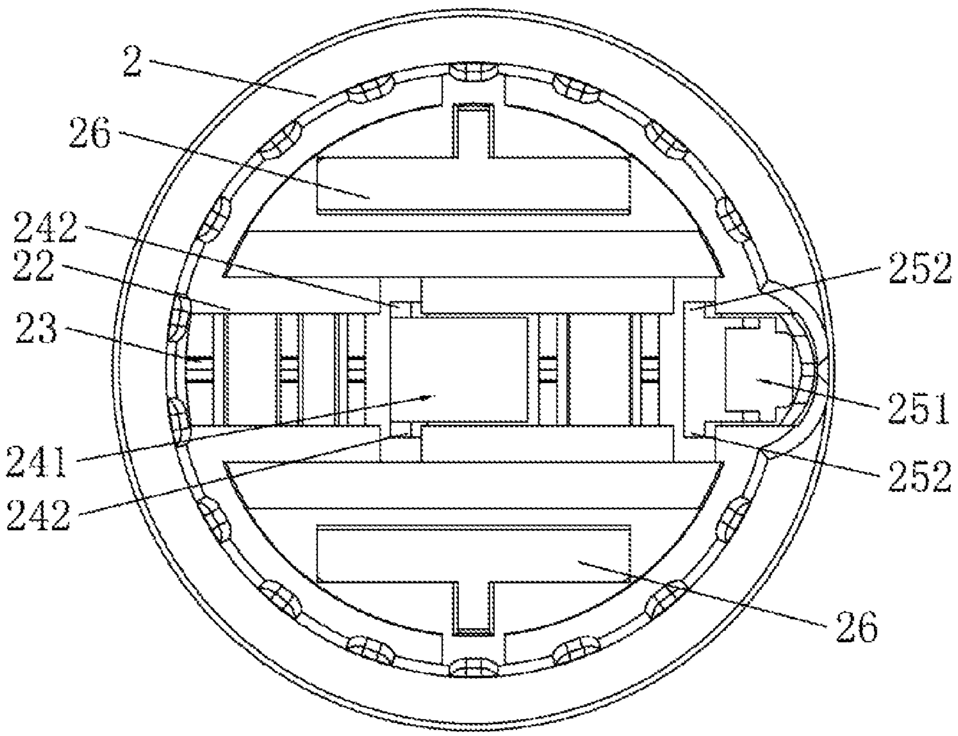
FIG. 5 is a structure diagram of a shell main body of the present disclosure.

In addition, a lamp holder and a lamp cover can be fixedly arranged at the upper end of the shell main body 2 in a buckling or screwing mode. Wherein, for the lamp holder top cover 3 assembled in a buckling mode, the following structural design can be adopted, specifically, as shown in FIG. 2, FIG. 3 and FIG. 5, the lamp holder top cover 3 is provided with two top cover buckling tongues 32 which protrude and extend downwards respectively, each top cover buckling tongue 32 and the lamp holder top cover 3 are of an integrated structure, and the two top cover buckling tongues 32 are arranged at intervals oppositely; the main body installation part 22 is provided with main body buckling holes 26 corresponding to the top cover buckling tongues 32, and the top cover buckling tongues 32 are buckled and clamped in the corresponding main body buckling holes 26.

As a preferred embodiment, as shown in FIG. 1 to FIG. 4, a fixed hanging ring 33 is arranged on the upper surface of the lamp holder top cover 3, and the fixed hanging ring 33 and the lamp holder top cover 3 are of an integrated structure. For the fixed hanging ring 33, the lamp holder shell 1 can be conveniently hung, so that the installation of the present disclosure is improved.

It needs to be further explained that the novel lamp holder structure of the present disclosure adopts the following method to realize wiring installation, specifically comprising the following steps:

sep a, aligning and inserting the edge part of the first elastic sheet fixing part 42 into the first elastic sheet locating groove 242 so as to realize the installation of the first conductive elastic sheet 4;

sep b, aligning and inserting the edge part of the second elastic sheet fixing part 52 into the second elastic sheet locating groove 252 so as to realize the installation of the second conductive elastic sheet 5;

step c, locating and placing two wires in the wire placing groove 23 of the main body installation part 22; and step d, installing and fastening the lamp holder top cover 3, pressing the two wires by the top cover wire pressing part 31 of the lamp holder top cover 3 downwards, and enabling the first elastic sheet tip 41 of the first conductive elastic sheet 4 to pierce through an insulating layer of one wire and to be electrically in contact with a wire core of the wire, and enabling the second elastic sheet tip 51 of the second conductive elastic sheet 5 to pierce through an insulating layer of the other wire and to be electrically in contact with a wire core of the other wire.

In the bulb installation process, the upper end of a bulb is inserted into the bulb installation hole 21 of the shell main body 2, one electrode of the bulb makes elastic contact with the first elastic sheet elastic contact part 43 of the first conductive elastic sheet 4, the other electrode of the bulb makes elastic contact with the second elastic sheet elastic contact part 53 of the second conductive elastic sheet 5, and then the bulb is powered on.

Figure 4:
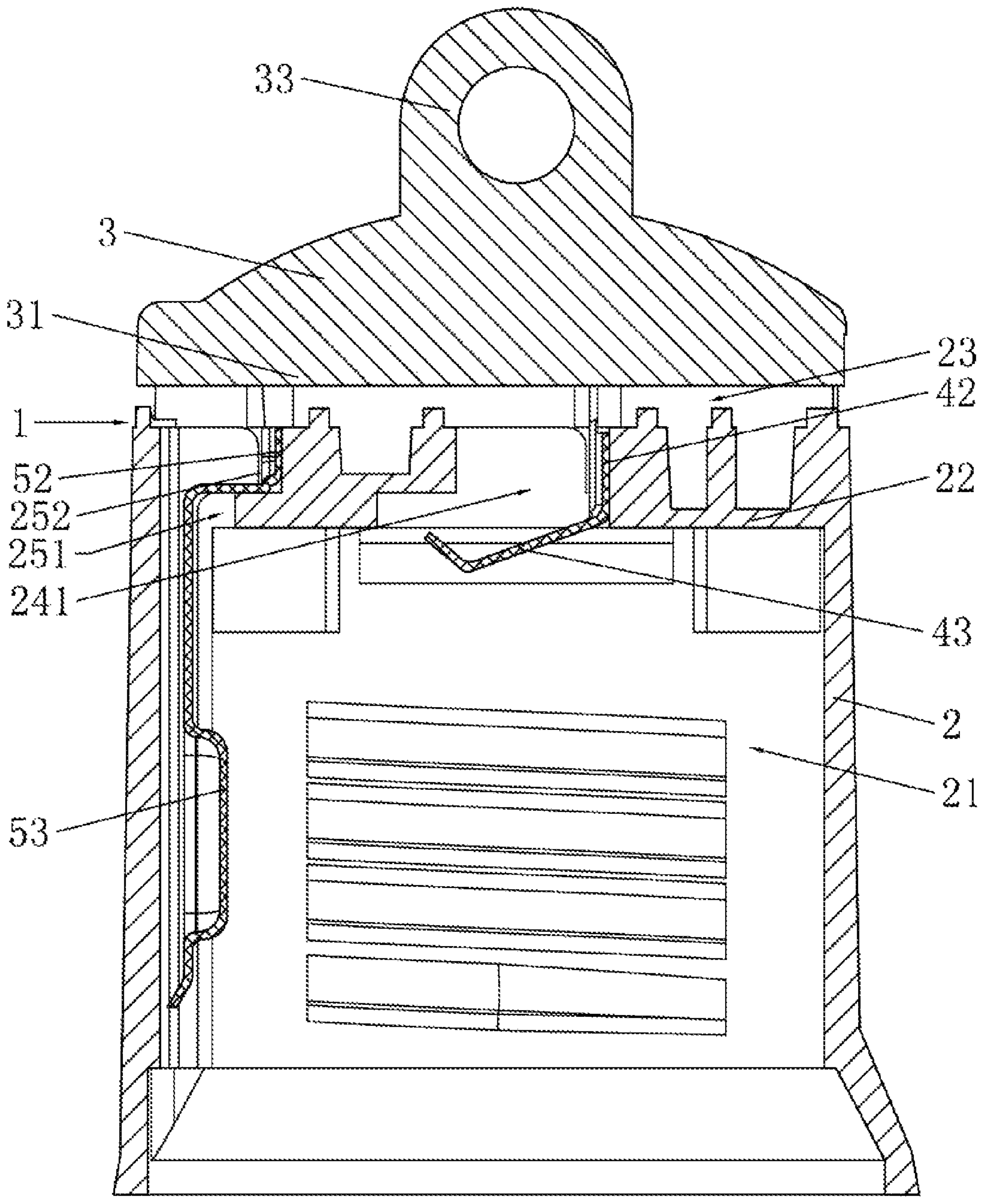
FIG. 4 is a cross-section diagram of the present disclosure at another position.

It needs to be further explained that the novel lamp holder structure can be a screw lamp holder structure or a buckle lamp holder structure; wherein, as shown in FIG. 3 and FIG. 4, the inner wall of the bulb installation hole 21 of the shell main body 2 is provided with a threaded structure, and the threaded structure of the inner wall of the bulb installation hole 21 can be designed into two half-tooth structures.

In these circumstances, by means of the structural design, the present disclosure has the advantages of being novel in design, simple in structure and convenient and fast to wire.

Figure 6:
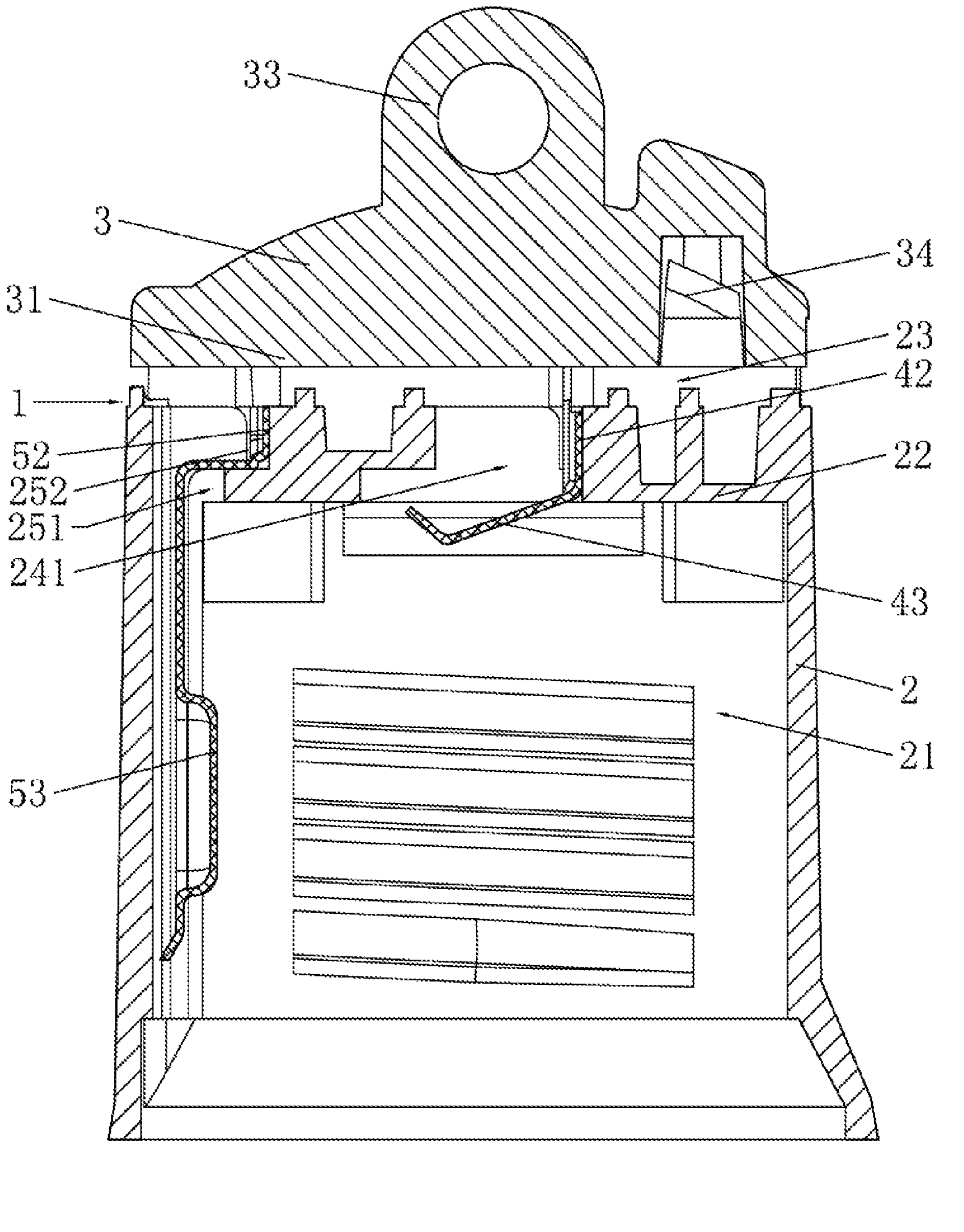
FIG. 6 is a structure diagram of the second embodiment of the present disclosure.

As a preferred embodiment, as shown in the FIG. 6, the lamp holder top cover 3 is provided with a wire hiding hole 34 in the bottom surface of the top cover wire pressing part. When the novel lamp holder structure is applied to string lamps, a plurality of novel lamp holder structures are sequentially connected to a wire; and for the novel lamp holder structure serving as the tail end of the wire, the tail end of the wire can be inserted and hidden in the wire hiding hole 34.

Figure 7:
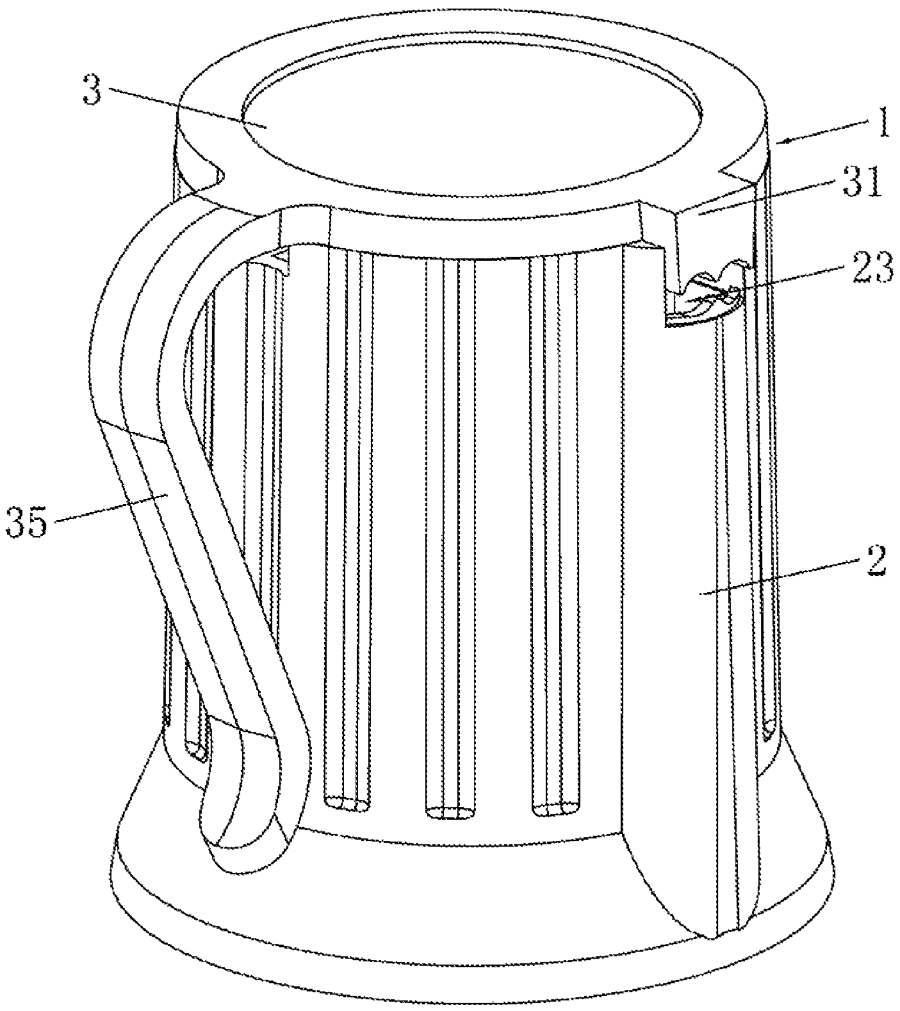
FIG. 7 is a structure diagram of the third embodiment of the present disclosure.

As a preferred mode of execution, as shown in FIG. 7, a fixed hook 35 is arranged on the edge part of the lamp holder top cover 3; and in the installation of the present disclosure, the present disclosure can be hooked at the corresponding installation position through the fixed hook 35.

Figure 8:
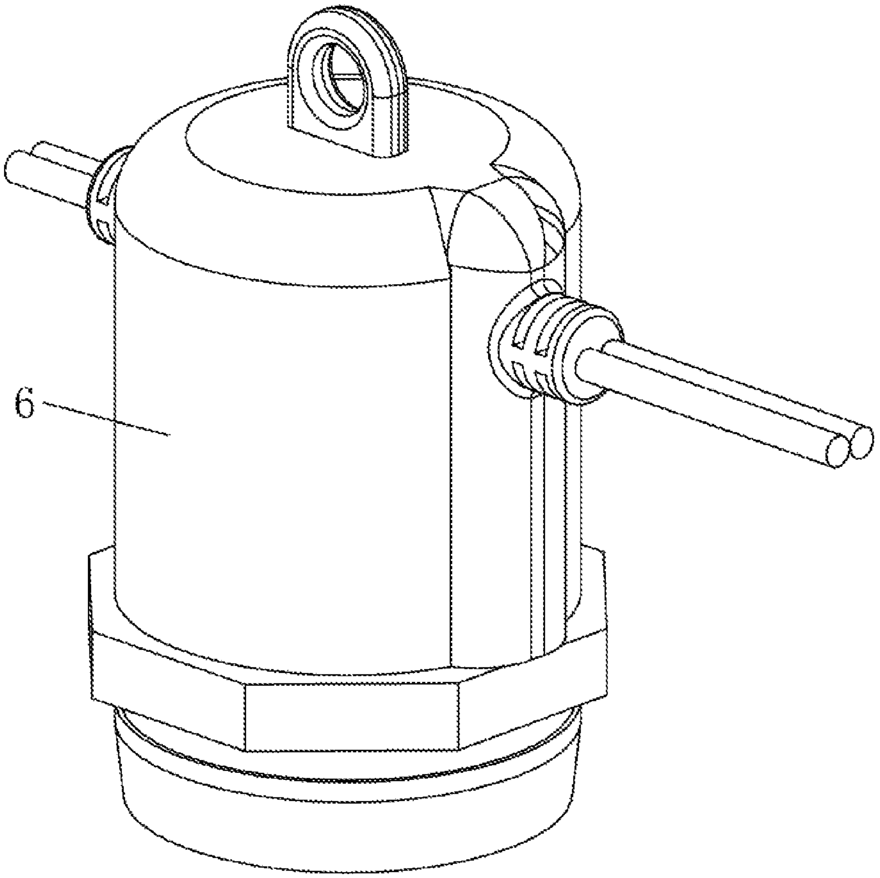
FIG. 8 is a structure diagram of the fourth embodiment of the present disclosure.
Figure 9:
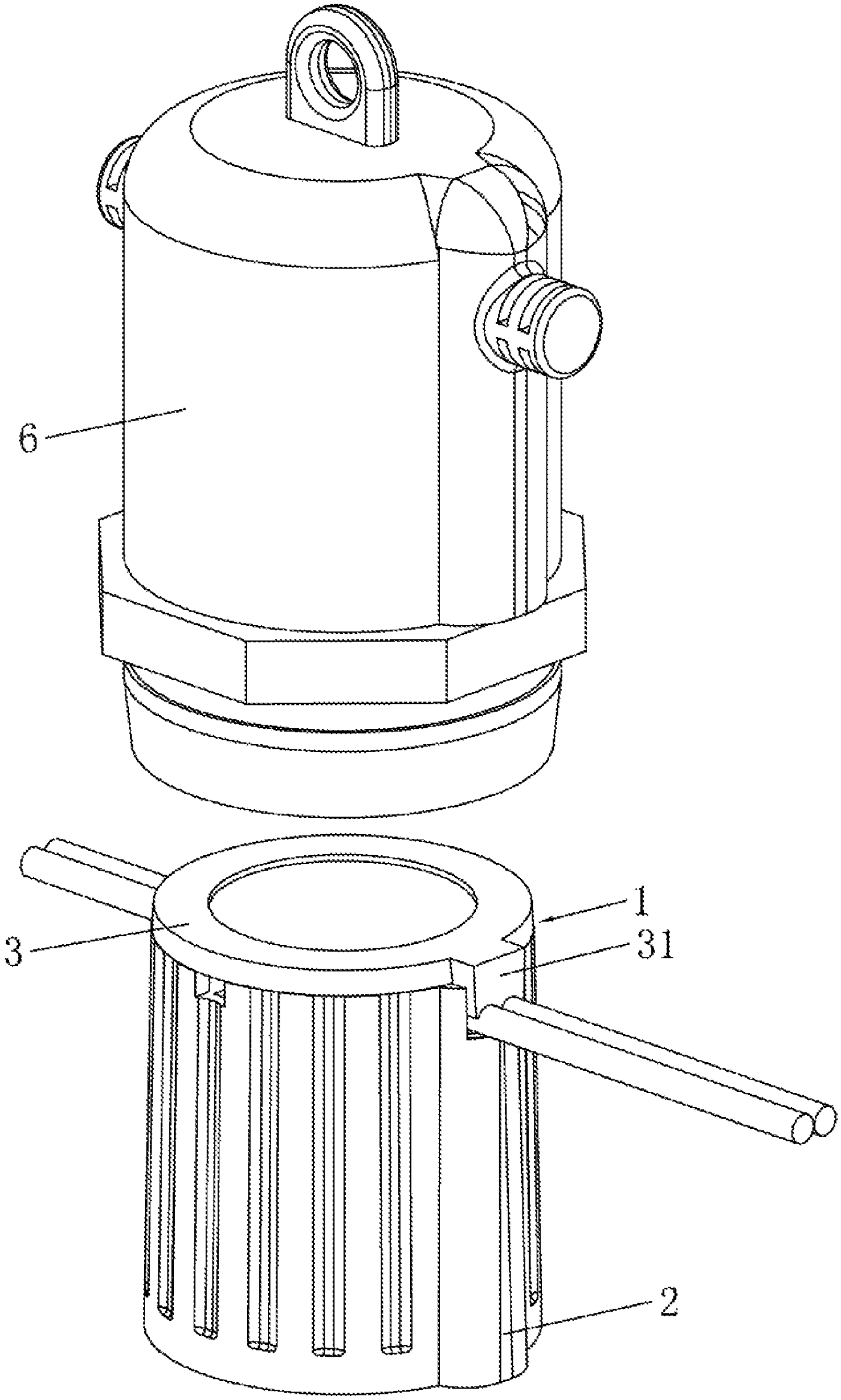
FIG. 9 is a decomposition diagram of the present disclosure.

As a preferred mode of execution, as shown in FIG. 8 and FIG. 9, the periphery of the lamp holder shell 1 is coated with a waterproof sealing rubber coating layer 6; and for the waterproof sealing rubber coating layer, on one hand, rubber coating sealing waterproof performance of a wire inlet end and a wire outlet end can be realized, and on the other hand, close contact with the surface of the bulb is achieved when the bulb is installed and the waterproof sealing of the bulb installation position is realized.

The foregoing is merely a preferred embodiment of the present disclosure, those skilled in the art can make various modifications in terms of specific embodiments and scope of application in accordance with the thoughts of the present disclosure, and the details of the description should not interpreted as the limitation of the present disclosure.

What is claimed is:

1. A novel lamp holder structure, characterized in that the novel lamp holder structure comprises a lamp holder shell (1), the lamp holder shell (1) comprises a shell main body (2) and a lamp holder top cover (3) arranged at the upper end of the shell main body (2), and the shell main body (2) and the lamp holder top cover (3) are hard plastic parts respectively;

a bulb installation hole (21) with a downward opening is formed in the shell main body (2); a main body installation part (22) located above the bulb installation hole (21) is arranged at the upper end of the shell main body (2), and the main body installation part (22) and the shell main body (2) are of an integrated structure; a wire placing groove (23) which is opened upwards and completely penetrates left and right is formed in the middle of the main body installation part (22) of the shell main body (2), a first installation groove (241) and a second installation groove (251) which communicate with the bulb installation hole (21) respectively are formed in the bottom surface of the wire placing groove, the first installation groove (241) and the second installation groove (251) are arranged at intervals, a first conductive elastic sheet (4) is embedded in the first installation groove (241), a second conductive elastic sheet (5) is embedded in the second installation groove (251), and the lower ends of the first conductive elastic sheet (4) and the second conductive elastic sheet (5) stretch into the bulb installation hole (21) respectively; the upper end of the first conductive elastic sheet (4) is provided with a first elastic sheet tip (41) which protrudes upwards and extends into the wire placing groove (23), and the upper end of the second conductive elastic sheet (5) is provided with a second elastic sheet tip (51) which protrudes upwards and extends into the wire placing groove (23);

a top cover wire pressing part (31) which protrudes downwards and is aligned with the wire placing groove (23) is arranged in the middle of the lamp holder top cover (3), and the top cover wire pressing part (31) and the lamp holder top cover (3) are of an integrated structure;

when the novel lamp holder structure is used for wiring, two wires are located and placed in the wire placing groove (23) of the main body installation part (22), the top cover wire pressing part (31) of the lamp holder top cover (3) presses the two wires downwards, the first elastic sheet tip (41) of the first conductive elastic sheet (4) pierces through an insulating layer of one wire and is electrically in contact with a wire core of the wire, and the second elastic sheet tip (51) of the second conductive elastic sheet (5) pierces through an insulating layer of the other wire and is electrically in contact with a wire core of the other wire; the first conductive elastic sheet (4) comprises a first elastic sheet fixing part (42) and a first elastic sheet elastic contact part (43) arranged at the lower end of the first elastic sheet fixing part (42), the first elastic sheet tip (41) arranged at the upper end of the first elastic sheet fixing part (42), the first elastic sheet elastic contact part (43) stretches into the bulb installation hole (21), and the first elastic sheet fixing part (42), the first elastic sheet contact part (43) the first elastic sheet tip (41) are of an integrated structure; and a first elastic sheet locating groove (242) is formed in the inner wall of the first installation groove (241), and the edge part of the first elastic sheet fixing part (42) of the first conductive elastic sheet (4) is embedded in the first elastic sheet locating groove (242).

2. The novel lamp holder structure according to claim 1, characterized in that the second conductive elastic sheet (5) comprises a second elastic sheet fixing part (52) and a second elastic sheet elastic contact part (53) arranged at the lower end of the second elastic sheet fixing part (52), the second elastic sheet tip (51) is arranged at the upper end of the second elastic sheet fixing part (52), the second elastic sheet elastic contact part (53) stretches into the bulb installation hole (21), and the second elastic sheet fixing part (52), the second elastic sheet elastic contact part (53) and the second elastic sheet tip (51) are of an integrated structure;

and a second elastic sheet locating groove (251) is formed in the inner wall of the second installation groove (252), and the edge part of the second elastic sheet fixing part (52) of the second conductive elastic sheet (5) is embedded in the second elastic sheet locating groove (252).

3. The novel lamp holder structure according to claim 1, characterized in that the first conductive elastic sheet (4) and the second conductive elastic sheet (5) are copper elastic sheets respectively.

4. The novel lamp holder structure according to claim 1, characterized in that the lamp holder top cover (3) is provided with two top cover buckling tongues (32) which protrude and extend downwards respectively, each top cover buckling tongue (32) and the lamp holder top cover (3) are of an integrated structure, and the two top cover buckling tongues (32) are arranged at intervals oppositely;

and the main body installation part (22) is provided with main body buckling holes (26) corresponding to the top cover buckling tongues (32) respectively, and the top cover buckling tongues (32) are buckled in the corresponding main body buckling holes (26) respectively.

5. The novel lamp holder structure according to claim 1, characterized in that a fixed hanging ring (33) is arranged on the upper surface of the lamp holder top cover (3), and the fixed hanging ring (33) and the lamp holder top cover (3) are of an integrated structure.

6. The novel lamp holder structure according to claim 1, characterized in that the lamp holder top cover (3) is provided with a wire hiding hole (34) in the bottom surface of the top cover wire pressing part (3).

7. The novel lamp holder structure according to claim 1, characterized in that a fixed hook (52) is arranged on the edge part of the lamp holder top cover (3).

8. The novel lamp holder structure according to claim 1, characterized in that the periphery of the lamp holder shell (1) is coated with a waterproof sealing rubber coating layer (6).

* * * * *